Oct. 4, 1966          W. RUF          3,276,502

VEHICLE WITH MEANS FOR ADJUSTING THE AIR PRESSURE IN THE TIRES

Filed Dec. 3, 1964          2 Sheets-Sheet 1

Inventor
Walter Ruf
By Stevens, Davis, Miller & Mosher
Attorneys

United States Patent Office 3,276,502
Patented Oct. 4, 1966

3,276,502
VEHICLE WITH MEANS FOR ADJUSTING THE AIR PRESSURE IN THE TIRES
Walter Ruf, Bottighofen, Landhaus am See, Kanton Thurgau, Switzerland
Filed Dec. 3, 1964, Ser. No. 415,573
Claims priority, application Germany, Dec. 5, 1963, R 36,726; July 2, 1964, R 38,271
6 Claims. (Cl. 152—417)

The invention relates to a vehicle, particularly a motor vehicle, with means for adjusting the air pressure in the tires, the tires each communicating via a rotor connection and an adjusting device with a central compressed air source.

It is known for amphibious and desert vehicles to be equipped with means for enabling various tire pressures to be set while the vehicle is traveling or stationary. With a tire pressure of, for example, 0.85 atmosphere a heavy vehicle can drive over loose sand, soft ground or mud without sinking in. But for rapid road travel a pressure of, for example, 2.8 atmospheres is necessary, since otherwise the tires would be overheated and would be destroyed after traveling a short distance. In the known means the tires communicate with a central air pressure source via rotor connections in the form of hubs with rotary pressure seals and each via a separate stopcock. The stopcocks are arranged on a dashboard in the drivers' cabin so that the air pressure in the tires can be suitably adjusted by operating them.

In known embodiments it is difficult to obtain equal pressure in all of the tires. The actuation of a large number of cog wheels and adjustment of the pressure for each tire is troublesome and difficult to carry out under combat conditions.

In known embodiments, the rotor connection communicates permanently with the interior of the tire. The connection must accordingly be of specially high quality so that no pressure is lost from the tire. If the connection should be damaged the air escapes from the tire.

The invention aims to provide a vehicle with means for adjusting the air pressure in the tires, permitting improved filling and unloading of the tires.

Another aim of the invention is that the means should be so designed that under normal conditions the tires are shut off from their associated rotor connections and from the compressed air system.

A further aim of the invention is that the apparatus should be designed so that leakage losses through the rotor connection should not lower the pressure of the tires.

Another aim of the invention is that the means should be designed so that, for example if a tire is damaged by a shot, the loss of pressure therein cannot affect the other tires.

It is also a feature of the invention that the means should be designed so that, by merely actuating a single adjustment member, it is possible simultaneously to deflate all the tires to a safety pressure for travel over sand or mud. The means are designed so that it is also possible to reinflate all the tires to any desired higher pressure by actuating one and the same member.

Another feature of the invention is that the apparatus should be designed so that within a given pressure range the connection between the tires and the compressed air source is automatically broken, that from a given excess pressure the tires are filled to the difference between the excess pressure and a set pressure, and that at low pressure, when the system is unpressurized or when the pressure is even higher than the excess pressure needed for filling, the tires are deflated to a safety pressure.

An apparatus according to the invention is designed with all the tires associated with a single central supply line and a single adjustment member and with a valve arrangement provided between each tire and its associated rotor connection. The valve arrangement preferably opens both when the pressure is a given amount above the tire pressure and when it is a given amount below it.

According to the invention there is provided a vehicle having means for adjusting the air pressure in all of its tires simultaneously, said means comprising a compressed air source, a valve arrangement mounted on each wheel of the vehicle and associated with the tires on the respective wheels, a pipe system communicating the compressed air source, a valve arrangement mounted on each wheel adjusting device provided in the pipe system, wherein the valve arrangements in each of the wheels are opened only when pressure in the pipe system exceeds or is less than a given pressure range which is controlled by the adjusting device.

In a preferred embodiment, the valve arrangement in each case contains two valve members arranged coaxially and subject to spring pressure.

Further advantages and details of the invention will become apparent from the accompanying drawings in conjunction with the following detailed description. In the drawings.

Figure 1:
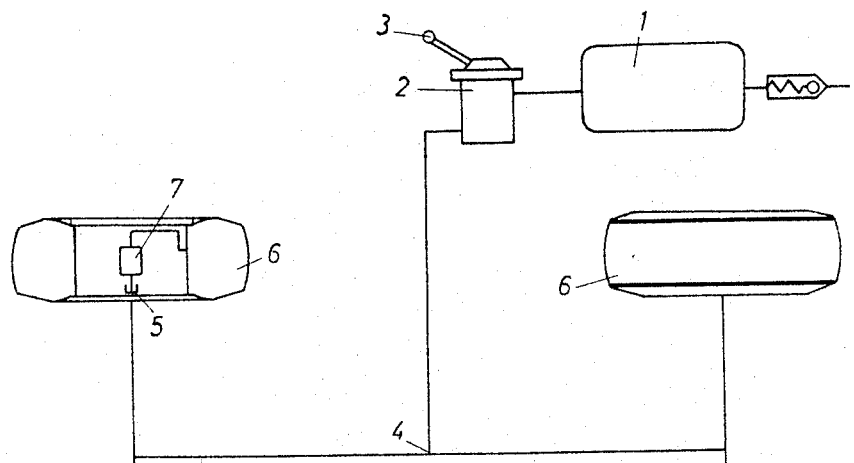
FIG. 1 is a diagrammatic view of the whole arrangement.
Figure 2:
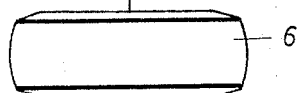
FIG. 2 is a diagrammatic section through a tire filled to high pressure.
Figure 4:
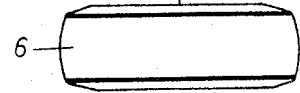
FIG. 4 is a diagrammatic section through a tire filled to a low pressure.

A central compressed air source 1 is connected via an adjustment device or tap 2 with a lever or actuating member 3 to a pipe system 4 leading to rotor connections 5 each of which is associated with each tire 6 of a vehicle. Between the tires 6 and the rotor connections 5 a valve arrangement 7 is interpolated in each case.

Figure 3:
FIG. 3 shows the tire imprint associated with FIG. 2.

In a given mean pressure range in the pipe system 4 the valves 7 remain closed. If the air pressure in the tires 6 is to be increased for rapid travel along level roads, so as to obtain the small imprint shown in FIG. 3 with the tire doing low fulling or crimping work, the lever 3 of the adjustment device 2 is swung into a "filling" position so that compressed air flows from the source 1 into the pipe system 4. The valves 7 are set to a given opening pressure, to which the pressure in the tires 6 is added. When the pressure in the pipe system 4 has reached the sum of the tire pressure plus the opening pressure, the valves 7 open so that compressed air can flow into the tires 6. The tires are thus filled to a pressure equal to the difference between the pressure in the pipe system 4 and the opening pressure of the valves 7. When the lever 3 is moved into its normal position the valves 7 close again.

Figure 5:
FIG. 5 shows the tire imprint associated with FIG. 4.

For driving over mud, slush, sand or the like, the broad tire imprint shown in FIG. 5 is required, corresponding to a relatively low pressure. The lever 3 is moved into a "deflating" position in which the pipe system 4 is preferably depressurized. The valves 7 re-open when the pressure in the pipe system 4 is a given amount less than the pressure in the tires 6. The air in the tires 6 therefore passes through the valves 7 and into the pipe system 4 until the desired pressure, known as the "safety air pressure," is reached. The valves 7 then close again to prevent the pressure in the tires 6 from dropping any further.

Figure 6:
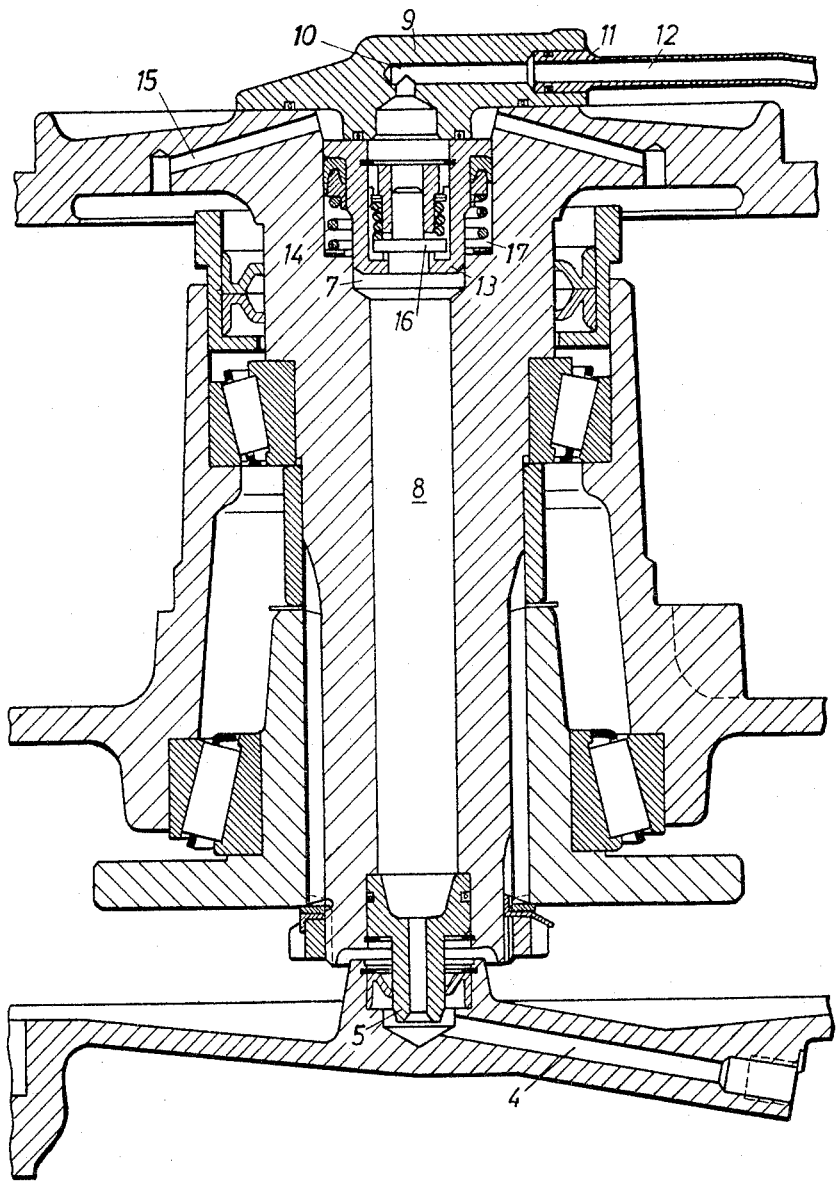
FIG. 6 is a section through a hub of a wheel.

In the preferred embodiment illustrated in FIG. 6, the pipe 4 opens into a rotor connection 5 at the inside of the wheel hub. From the connection 5 a passage 8 bridging the whole width of the hub leads to a valve arrangement 7 on the outside of the hub. The valve arrangement 7 communicates, via a pipe 10 accommodated in a cover 9 and a connection 11, with a pipe 12 leading to the tires 6. The tires 6 are always separated from their associated rotor connections 5 except during their inflation. As it is mounted on the outside of the wheel, the cover 9 can easily be removed, so that the valve arrangement 7 is easily accessible. The references to inside and outside of the wheel where referred to above and elsewhere in this specification are intended to mean inside and outside with respect to a vehicle. Thus when a wheel is fitted to a vehicle, inside means the side of the wheel facing towards the vehicle and the outside means the side facing outwards away from the vehicle.

The pressure of air in the tire 6 acts on the valve arrangement 7 through the pipe 12 so as to force back a valve member 13 in the valve arrangement 7 against the action of a spring 14. The pressure in the central pipe system 4 acts on the other side of valve arrangement 7 via the passage 8. So long as the pressure in the pipe system 4 and passage 8 is at a given preset value the valve arrangement 7 will be closed and will prevent air from flowing through the valve arrangement 7 in both directions, regardless of whether the pressure in the pipe 12 rises through heating of the tires or drops to zero through damage to the tire or changing of the wheels.

If it is desired to drive over mud, slush, sand or the like a broader higher imprint is needed and the pressure in the tire must accordingly be lowered. The lever 3 is therefore opened whereupon the pressure prevailing in the central pipe system 4 is lowered, preferably to atmospheric pressure. Now that the counter pressure in the passage 8 is withdrawn the valve member 13 is displaced against the action of its spring 14. Thus air passes out of the tire 6, not into the central pipe system but directly into the atmosphere through holes 15. When the pressure of air in the tires 6 and pipes 12 equal the combined pressure of air in the passage 8 and pipe system 4 and the force of the spring 14, the valve member 13 of each valve arrangement 7 is returned to its former position and the valves associated with the various tires 6 close automatically.

If the pressure in the tires is to be raised to a pressure suitable for road use, i.e., so that a small tire imprint with low fulling or crimping work for the tires is obtained, the adjustment member 3 is actuated to allow compressed air from the source 1 to pass into the central pipe system 4. The pressure in the pipe system 4, rotor connection 5 and passage 8 is increased until a valve plate 16 of the arrangement 7 is now forced back against the action of an associated spring 17. This permits compressed air to pass through the valve arrangement 7 and flow along the pipe 12 to the tires 6 so that the latter is filled to the desired pressure.

If desired, the valve arrangement 7 may be modified so as to open and unload the tire when there is pressure in excess of a given filling pressure. All that this requires is a different disposition of those surfaces of the valve member 13 which are subject to the tire pressure and the pressure in the central pipe system, in conformity with the closing and opening movement of said member.

Once the cover 9 has been removed the valve arrangement 7 is easily accessible, so that repairs can be carried out rapidly and the valve springs 14 and 17 easily exchanged if necessary. Thus it is not necessary for the hub with the brake drum, etc., to be completely dismantled when the valve arrangement 7 is to be inspected.

Since the tires 6 are normally separated from their rotor connections 5 and from the pipe 4 any rise in the pressure of the tires due to heating is maintained. Such a rise in pressure occurs, for example, when driving rapidly along a motorway but this is desirable since it counteracts excessive heating of the tires.

Other embodiments and modifications of the invention are possible without departing from the scope thereof as defined by the appended claims.

I claim:

1. In a vehicle having a chassis, at least one axle attached to said chassis, wheels rotatably fixed to each axle, an air-filled tire on each wheel, a hub on each wheel, a passage in each said hub, and a device by means of which any appropriate air pressure can be uniformly set in all tires even while the vehicle is traveling; said device comprising an air pressure source; a rotor connected to the hub of each wheel; a stationary inlet through each of said rotor connections; an outlet from each of said rotor connections; each of said outlets rotating with the associated wheel relatively to said inlet and communicating with the passage of the hub of said associated wheel; an adjusting tap, an inlet connection, at least one outlet connection and an actuating member on said tap; a main pipe leading from said air pressure source to the inlet connection of said adjusting tap; a single connecting pipe system leading from the outlet connection of said tap to the inlets of each said rotor connections, a valve arrangement in the hub of each wheel communicating on the inlet side of the passage in the hub; pipes each connecting one of the valve arrangements to the interior of the tire on the associated wheel, said valve arrangements being so designed that they open and thereby connect each passage to its associated pipe for a given excess pressure, which can be set by means of the actuating member on said adjustment tap, and a given low pressure existing in the passage of the hubs and in the interconnecting pipes relatively to the pressure of the tires.

2. A vehicle as claimed in claim 1 wherein each of said valve arrangements has a cover provided with said outlet to connect it to the associated connecting pipe.

3. A vehicle according to claim 1 in which each said valve arrangement is mounted interchangeably on the outside of the hub of the associated wheel.

4. A vehicle according to claim 1 in which channel means connected to the open atmosphere is opened upon establishment of a given vacuum in the connecting pipe system to thereby allow escape of air from a tire.

5. A vehicle according to claim 1 in which said valve arrangement comprises two spring biased non-return valves arranged coaxially to each other.

6. A vehicle according to claim 1 in which compressed air is supplied from the inside of the wheel hub.

References Cited by the Examiner
UNITED STATES PATENTS

| | | | |
|---|---|---|---|
| 2,177,042 | 10/1939 | Michael | 152—416 X |
| 2,849,047 | 8/1958 | Lamont et al. | 152—417 |
| 2,976,906 | 3/1961 | Kamm et al. | 152—417 |

ARTHUR L. LA POINT, *Primary Examiner.*

C. W. HAEFELE, *Assistant Examiner.*